United States Patent
Yates et al.

(10) Patent No.: US 8,544,068 B2
(45) Date of Patent: Sep. 24, 2013

(54) BUSINESS PRE-PERMISSIONING IN DELEGATED THIRD PARTY AUTHORIZATION

(75) Inventors: Robert Leslie Yates, Arlington, MA (US); Prashant S. Kulkarni, Apex, NC (US); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/943,218

(22) Filed: Nov. 10, 2010

(65) Prior Publication Data
US 2012/0117626 A1    May 10, 2012

(51) Int. Cl.
    *G06F 7/04*    (2006.01)
(52) U.S. Cl.
    USPC ...................................... 726/4; 726/21; 726/3
(58) Field of Classification Search
    None
    See application file for complete search history.

(56) References Cited

U.S. PATENT DOCUMENTS

| | | |
|---|---|---|
| 2005/0010756 A1 | 1/2005 | Clerc |
| 2007/0130463 A1 | 6/2007 | Law et al. |
| 2009/0254978 A1 | 10/2009 | Rouskov et al. |
| 2009/0282253 A1 | 11/2009 | Rose et al. |
| 2009/0300355 A1 | 12/2009 | Crane et al. |
| 2010/0011431 A1 | 1/2010 | Cynkin et al. |
| 2010/0251353 A1* | 9/2010 | Hodgkinson ............ 726/9 |
| 2012/0023556 A1* | 1/2012 | Schultz et al. ............ 726/4 |

OTHER PUBLICATIONS

Hammer-Lahav, "The OAuth 1.0 Protocol," Internet Request for Comments (RFC) 5849, Apr. 2010.
Ming et al, "Data Sharing in Campus Network," ITIME '09, Aug. 2009.
"OAuth for Web Applications," 2010.

\* cited by examiner

*Primary Examiner* — Pramila Parthasarathy
(74) *Attorney, Agent, or Firm* — Jeffrey S. LaBaw; David H. Judson (57) ABSTRACT

A method to manage access to end user-protected resources hosted in a shared pool of configurable computing resources, such as a cloud computing environment, begins by registering a particular application or service into the environment. The application or service is one that is being permitted to access resources on behalf of end users via a delegated authorization protocol, such as OAuth. For at least one end user associated with the organization, a permission is set, preferably by an organization entity, such as an organization administrator. The permission determines whether the application or service is permitted to access one or more resources associated with the end user. Then, in response to a request by the third party application to access a resource, where the request is received via the delegated authorization protocol, the permission is then used to determine whether the third party application is permitted to access the resource.

16 Claims, 6 Drawing Sheets

```
[x] LotusLive - Edit User  [+]
[ ] Renovations  My Dashboard  People ▼  Apps ▼

Personal                  Edit User
  Settings                Basics
Renovations               Name:              [Frank              ] [Adams             ]
  Company Account         Language:          [English        ▼]  (?)
  User Accounts           Role:              [ ] Administrator  [✓] User
  Subscriptions           Subscriptions      602
  Integrated Apps         Collaboration:     (1) LotusLive Engage 15 (Expires Mar 9, 2011)  change
  LotusLive Labs                             Files quota: 1GB
  Order History           Integrated Apps    [✓] Salesforce.com™ Description
Settings                                     [✓] Silanis e-SignDoc™ Description
  Security                                   [✓] Vondle Live Description      604
  Theme                                      [✓] Silanis e-SignRoom™ Description
  Lotus Notes                                [✓] Skype™ Description
  Profile Customization                      [✓] Tungle Description
  Profile Privacy                            Specific services are required for some integrated
  File Sharing                               apps. Refer to the description for details.
  File Download History   Account Identity
  Company Extensions      Email:             [frank.adams@mailinator.com]  change (?)
                          Department:        [Sales                ]              (?)
                          [Save Changes]  [Cancel]
```

BUSINESS PRE-PERMISSIONING IN DELEGATED THIRD PARTY AUTHORIZATION

BACKGROUND OF THE INVENTION

1. Technical Field

This disclosure relates generally to techniques for enabling controlled access to resources in a cloud compute environment.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible, e.g., through a conventional Web browser over HTTP.

In a traditional client-server authentication model, a client uses its credentials to access resources hosted by a server. With the increasing use of distributed web services and cloud computing, third-party applications often require access to these server-hosted resources. OAuth is an open protocol (Internet Request for Comment (RFC) 5849) that enables users to share their private data among different Web sites along with their credentials while only exposing the data on the original Web site where it is held. In particular, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users. To accomplish this functionality, OAuth introduces a third role to the traditional client-server authentication model: namely, a resource owner. In the OAuth model, the client (which is not the resource owner, but is acting on its behalf) requests access to resources controlled by the resource owner but hosted by the server. In addition, OAuth allows the server to verify not only the resource owner authorization, but also the identity of the client making the request.

BRIEF SUMMARY

A method to manage access to end user-protected resources hosted in a shared pool of configurable computing resources, such as a cloud computing environment, begins by registering a particular application or service into the environment. The application or service is one that is being permitted to access resources on behalf of end users via a delegated authorization protocol, such as OAuth. For at least one end user associated with the organization, a permission is set, preferably by an organization entity, such as an organization administrator. The permission determines whether the application or service is permitted to access one or more resources associated with the end user. Then, in response to a request by the third party application to access a resource, where the request is received via the delegated authorization protocol, the permission is then used to determine whether the third party application is permitted to access the resource.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 5 illustrates a display screen by which an organization administrator using the techniques disclosed herein registers or integrates a third party application or service into a cloud compute environment;

DETAILED DESCRIPTION OF AN ILLUSTRATIVE EMBODIMENT

Figure 1:
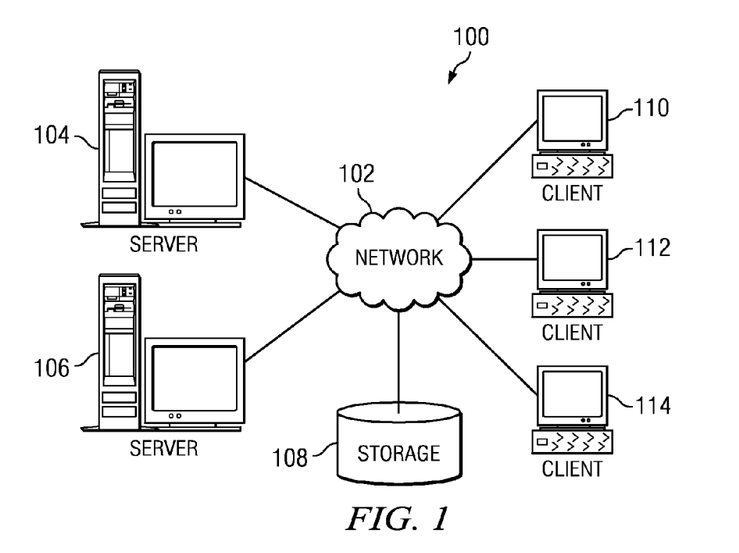
FIG. 1 depicts an exemplary block diagram of a distributed data processing environment in which exemplary aspects of the illustrative embodiments may be implemented.
Figure 2:
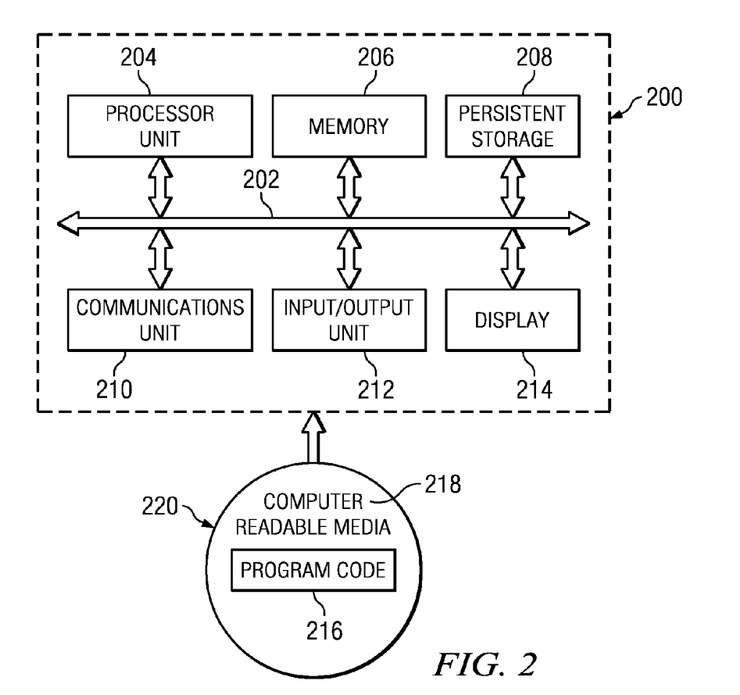
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, OAuth is an open protocol which enables users to share their private data between different Web sites along with their credentials, but only expose the data on the original Web site where it is held. As described briefly above, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users.

Figure 3:
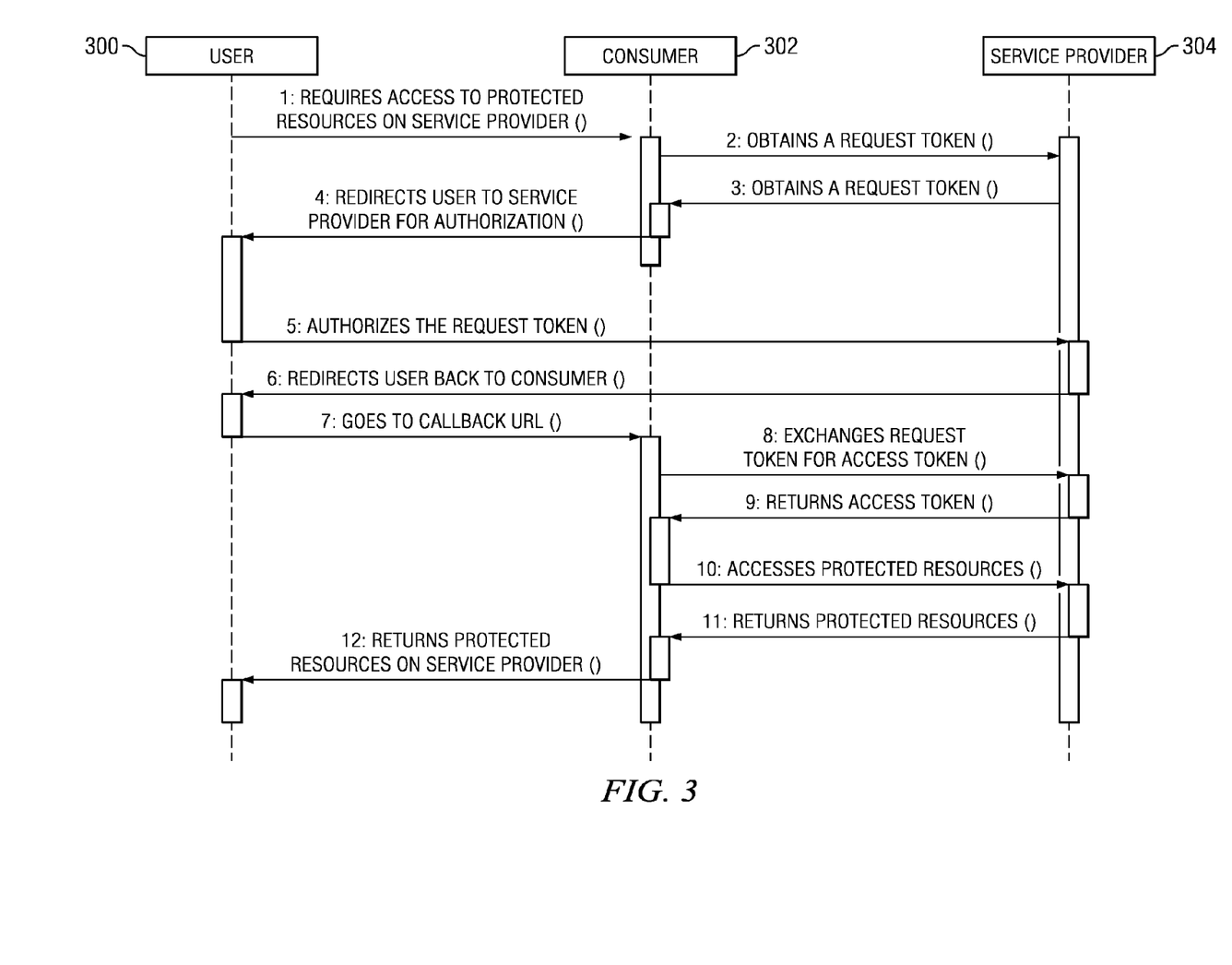
FIG. 3 illustrates how a delegated authorization protocol such as OAuth is used in a consumer website environment.

The use of OAuth is shown in FIG. 3 with respect to a consumer-facing website. As illustrated in FIG. 3, in this embodiment there are three (3) players in OAuth: a user 300, a consumer 302, and a service provider 304. A typical OAuth interaction scenario can be described as follows. By way of background, it is assumed that the service provider 304 is a photo sharing website that holds or stores some private photos for the user 300. It is also assumed that the site, however, does not provide a print service. Thus, when the user 300 wants to print his or her photos, he or she can go to another site, such as a photo printing site, which is represented by the consumer 302, which in this example scenario provides a print service. The printer site (consumer 302), however, does not have the user's photos and must obtain the desired photos from the photo sharing site (service provider 304). Therefore, there must exist an appropriate data flow from photo sharing site 304 to photo printing site 302. OAuth facilitates this process. In particular, if the photo sharing site 304 allows authentication using OAuth, then when the user 300 wants to print photos (held on the printing site 302), site 302 redirects the user 300 to site 304 to grant it (site 302) access to the user's photos. The user also may be prompted to give permission to site 302 for reading the photos, or permission may be pre-set so this step can be skipped. When this is done, the user is redirected to the printer site 302. Now, the printer site 302 has permission to read the user's photos from the photo sharing site 304 and will be able to print that user's photos on demand. In all the steps, the printer site 302 does not know the user's credentials for logging into the photo sharing site 304. In this manner, the user's privacy is better protected.

FIG. 3 illustrates the above process in a simplified sequence flow diagram. At step 1, a user issues a request to the printing site 302. This request may be made using a conventional web browser. The request indicates a desire of the user to access one or more protected resources on the service provider, namely, on photo sharing site 304. At step 2, the printing site 302 makes a request to the photo sharing site 304 to obtain an OAuth request token. The service provider responds at step 3 by returning the request token. At step 4, the printing site 302 issues to the user's browser an HTTP redirect. The redirect causes the browser to initiate step 5, by which the browser makes a request to the service provider 304 to authorize the request token. At step 6, the service provider issues a redirect back to the user. This redirect, however, causes the browser to initiate step 7, by which the browser issues a callback URL to the printer site 302. At step 8, the printer site 302 exchanges the request token for an OAuth access token. Because the printer site has established its rights, the service provider responds by returning the access token to the printer site 302. This is step 9. At step 10, the printer site 302 makes the request to the service provider to access the protected resources originally requested by the user (in step 1). The protected resources are then returned from the service provider to the printing site at step 11 because the printing site has established that is has permission to read the user's photos. At step 12, the printing site returns to the requesting user the protected resources. This completes the process.

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 4:
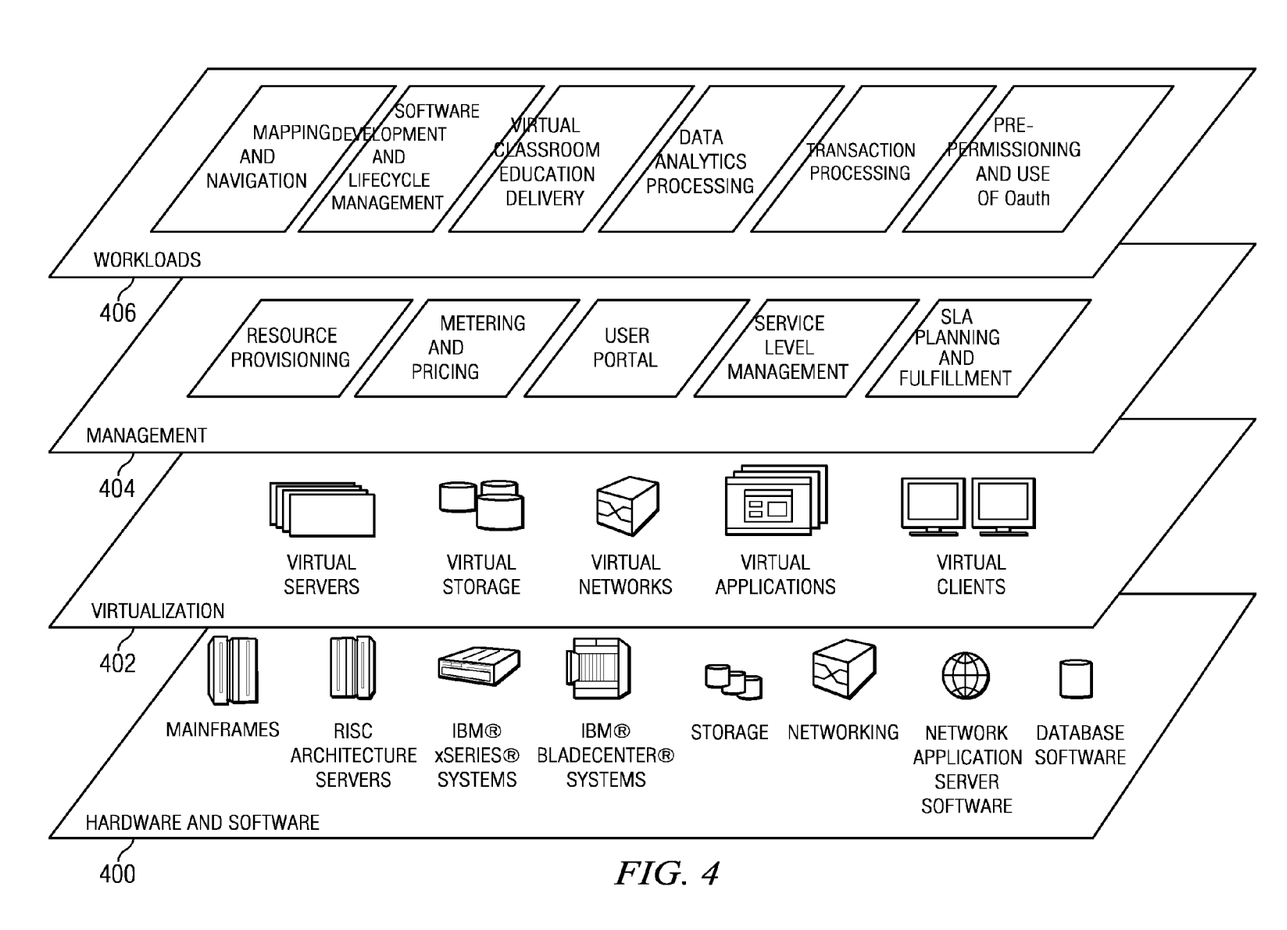
FIG. 4 depicts abstraction model layers of a cloud compute environment in which an embodiment herein may be practiced.

Referring now to FIG. 4, by way of additional background, a set of functional abstraction layers provided by a cloud computing environment is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 402 provides an abstraction layer from which the following examples of virtual entities may be provided: virtual servers; virtual storage; virtual networks, including virtual private networks; virtual applications and operating systems; and virtual clients.

In one example, management layer 404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, business "pre-permissioning" within the context of delegated third party authorization.

Although this disclosure includes a detailed description on cloud computing, implementation of the teachings recited herein are not limited to a cloud computing environment. Rather, embodiments of the techniques disclosed herein are capable of being implemented in conjunction with any other type of computing environment now known or later developed.

According to this disclosure, a third party application or service that is permitted to access resources on behalf of end users via a delegated authorization protocol (such as OAuth) are first registered in (or, more generally, integrated into) the cloud compute environment. Unlike the consumer-facing example described above in FIG. 3, where the end user himself or herself explicitly grants permission to a third party to access the user's resources, here the grant of permission preferably is done by another entity, such as an organizational administrator. In this scenario, the end user is associated with the organization, such as by being an employee, a consultant, or other permitted user. For at least one such end user associated with the organization, the administrator sets a "permission" that determines whether the third party application/service is permitted to access one or more resources associated with the end user. This permission may be set by the administrator on a one-off basis (i.e. for the particular end user), for all such end users, or for some subset thereof. Then, when a request (via the delegated authorization protocol) to access the resource is made by the third party application/service, the permission (as set by the organizational administrator) is used to determine whether such access should proceed.

Thus, according to the disclosure, an organizational administrator (or other permitted entity) grants third party applications/services access to resources owned by a user within the organization with respect to access requests that arrive via a delegated authorization protocol such as OAuth. The entity that grants the permission may be an individual, a computer system, a programmatic entity, or some combination thereof, that is other than the individual user (such as the user 300 in FIG. 3) that desires access to his or her own resources.

A representative cloud computing environment in which the disclosed techniques may be implemented is LotusLive. LotusLive is a multi-tenant and hosted offering that has a notion of third party applications (sometimes referred to as "services"), users, organizations, and administrators for the organization (each referred to herein as an "orgadmin"). Third party applications are registered or integrated in LotusLive and are given a key, together with a secret (as in a shared secret), that uniquely identifies the third party application or service within the cloud compute environment. Thus, the key and the secret represent the third party application's credentials (with respect to the cloud compute environment). FIG. 5 illustrates a display screen showing a listing of third party applications or services that have been integrated into a representative cloud compute environment. According to the techniques described herein, and as will be described in more detail below, the key and secret are then used by a delegated third party authorization protocol, such as OAuth, to enable the application/service to access resources associated with an end user.

Every user in LotusLive belongs to an organization. Preferably, the organization has an organization administrator ("orgadmin"). The orgadmin manages user membership and decides how content may be accessed beyond organizational boundaries. In particular, an orgadmin decides which third party applications have access to the user's content in the organization, the subset of users in the organization whose content may be accessed, the policies for content access (e.g., permissions, e.g., read-only, write-only, read-write access, etc., and scope, e.g., the subset of the data, the particular subsystem, the particular resource in a subsystem, etc.). Thus, the orgadmin performs "pre-permissioning" with respect to one or more end users whose resources are being managed within the cloud compute environment. Once this pre-permissioning is carried out, a third party application/service then initiates one or more steps required to obtain content owned by a user. In a preferred embodiment, the third party application/service does so using the OAuth protocol in a manner such as described above with respect to FIG. 3.

Figure 6:
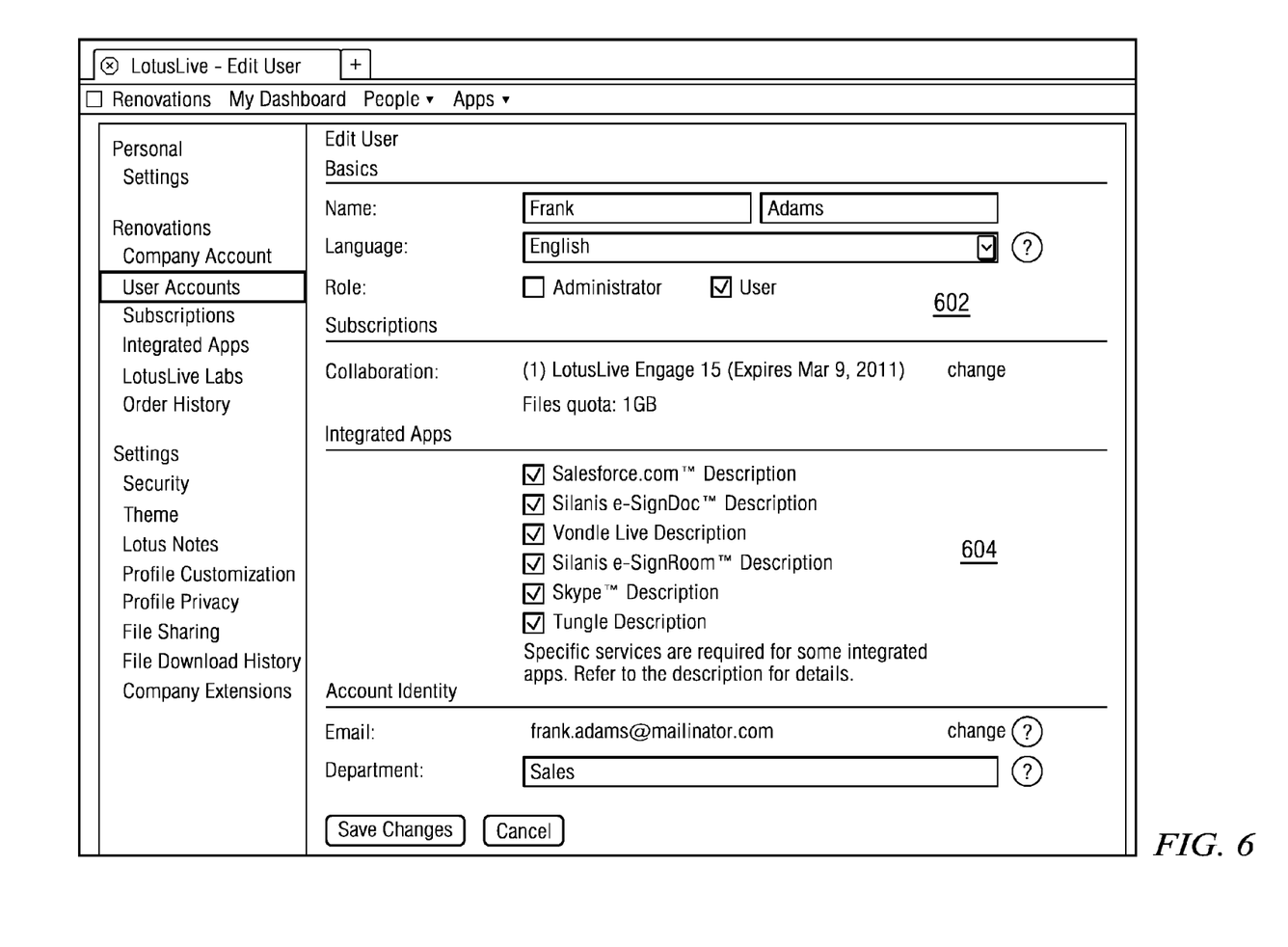
FIG. 6 illustrates a display screen by which the organization administrator associates a given permission with a particular end user in the organization, wherein the permission determines whether the third party application or service is permitted to access one or more resources associated with that end user and located in the cloud compute environment.

Referring now to FIG. 6, a display screen is shown by which the orgadmin sets (or more generally "associates") a "permission" for a particular end user. In this example, the orgadmin sets the permission for the end user on a one-off or "individual" basis (namely, just for this particular end user), although this is not a limitation. The orgadmin by default may set a permission that applies to all end users, or some subset thereof. In FIG. 6, an Edit User display interface 600 comprises an end user section 602 that identifies the user's name, language, and role. Section 604 of the display lists the one or more integrated applications/services that have been registered into the cloud compute environment. By selecting or unselecting a checkbox, the particular end user is associated with the third party application/service. By default, all applications/services may be checked, in which case the orgadmin has to unselect the checkbox (i.e. perform a de-selection) if the third party application/service is to be restricted from using OAuth to access the end user's resources. As new third party applications/services are integrated into the cloud, they are added to the list shown in FIG. 6, and the orgadmin can set the permissions (or leave any predetermined permissions) as appropriate. In this manner, the orgadmin determines which third party application/service is permitted to use the delegated authorization protocol with respect to the end user's resources.

The nature and scope of the "resources," as well as the types of access to those resources, is not limited.

Figure 7:
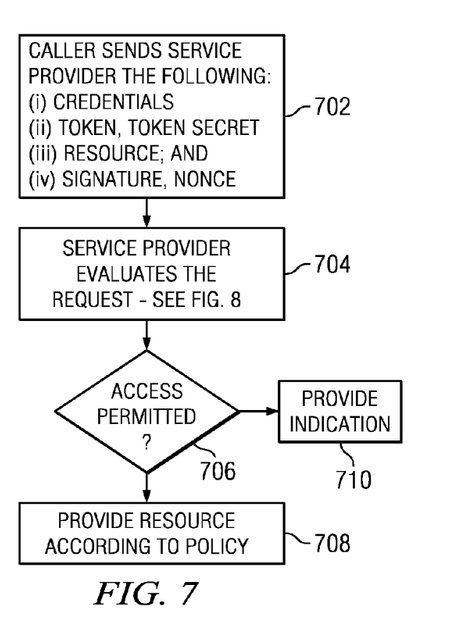
FIG. 7 is a process flow of a third party application/service making a call to the cloud compute environment to access a particular resource.

FIG. 7 is a process flow illustrates how the third party application/service uses OAuth to access an end user resource according to this disclosure. As noted above, it is assumed that the third party application/service has been registered or integrated into the cloud compute environment, and further that the orgadmin has set the permission for the end user. The process begins when an actual request to access content is made by a caller. At step 702, the third party application/service (or, more generally, the "caller") sends service provider the following: (i) its credentials (key and secret), (ii) a token, together with a token secret, that are associated with a user in the system, (iii) information specifying the resource that is being requested, and (iv) optionally, information (such as a digital signature and nonce) that may be used to detect a replay attack. At step 704, the service provider evaluates the request. At step 706, a determination is made whether the service provider will permit the caller to access the resource. If so, access is provided at step 708; otherwise, the routine branches to step 710 and provides an indication that access is not permitted.

Figure 8:
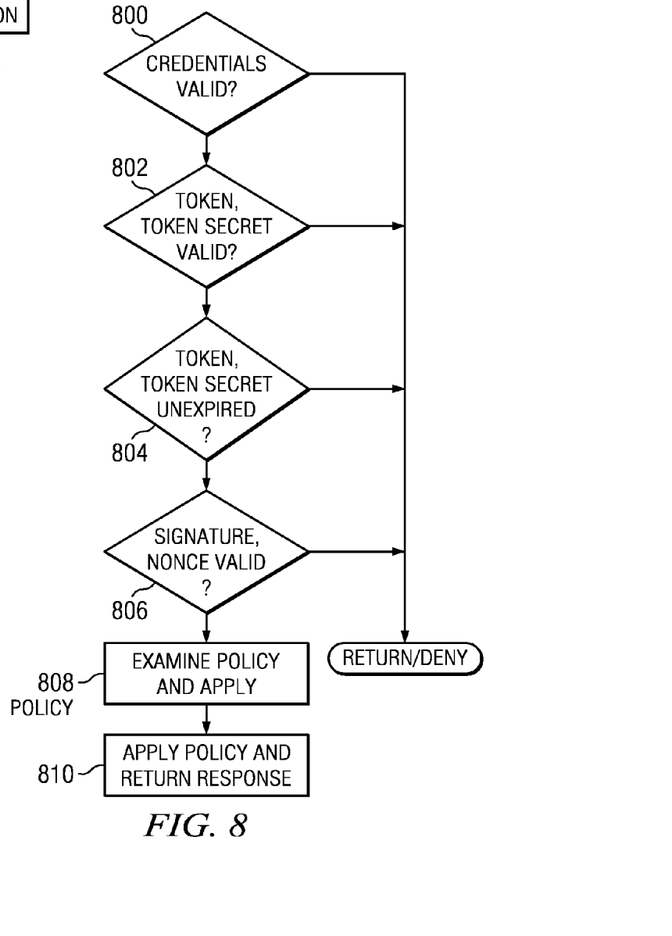
FIG. 8 is a process flow illustrating how the service provider responds to the call and provides the requested resource.

FIG. 8 is a process flow illustrating step 704 of FIG. 7 in more detail. The routine begins at step 800 by determining whether the third party caller's credentials (key and secret) are valid. If not, the routine returns. If the outcome of the test at step 800 is positive, the routine continues at step 802 to determine whether the token and token secret are valid and are associated with a valid user. If not, the routine returns. If the outcome of the test at step 802 is positive, the routine continues at step 804 to determine whether the token and the token secret are unexpired. If not, the routine returns. If the outcome of the test at step 804 is positive, a test is performed at step 806 to determine if the call is being replayed (e.g., via a "man-in-the-middle" or similar attack). This step determines whether the digital signature and nonce are valid, i.e., not being re-used. If the outcome of the test at step 806 is positive, a set of one or more policies associated with the token are then examined at step 808. A policy identifies a business rule by which content access is permitted and under what terms and conditions. Thus, for example, a policy may identify a particular right or permission with respect to the content (e.g., read only, write only, read-write access, etc.), what systems or subsystems may be accessed, etc. At step 810, the policy is applied to the request. This completes the processing.

The particular order or sequence of checks performed in FIG. 8 is merely representative. These steps may be performed in any particular order, with one or more steps being performed concurrently.

Preferably, the entity (the "grantor") granting permissions to the third party application/service is an organizational administrator with responsibility for the control and protection of resources owned by members of their organization. In another embodiment, the grantor is a person (or process) that the affected user (the one whose resources are being accessed) has specifically allowed to do so. In yet another embodiment, the grantor is a person within the affected user's social network, or within the organization's hierarchy.

The pre-grant (pre-permission) policy may vary depending on which permission or action is specified, which user's data access it is being specified for, which resources are impacted, and so forth. In one embodiment, the third party application/service is provided access to whatever the end user himself/herself can access. In other use scenarios, however, it may be desirable to restrict third party access to a more limited set of resources. In a cross-organization collaboration scenario, access by the third party application/service may only be permitted when the owner's organization has given access, when all those who can contribute content (through editing, commenting or the like) have given access, when all organizations with users who can read the resource have given access, and so forth. In yet another embodiment, the policy may be that only resources actually owned by users in an organization may be accessed by the third party application/service. As noted above, a particular policy may specify different actions/permissions, such as read, write, or other API-specific operations. Permissions based on resource or object attribute, such as type (file, activity, etc.) groupings, tags, or other metadata, may be enforced as part of a policy. Further, access may be granted based on a group, role, tag, or other metadata associated with the owner or accessing user. Other dimensions of the policy may enforce other protocol-specific elements that are available at the time of the access. One such example is expiration time, which is an OAuth attribute. In this embodiment, the policy may define how the expiration time is processed.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The pre-permission technique described herein may be implemented in or in conjunction with various server-side architectures other than cloud-based infrastructures. These include, without limitation, simple n-tier architectures, web portals, federated systems, and the like.

As the above examples illustrate, one or more of the registration and pre-permission functions may be hosted within or external to the cloud.

Still more generally, the subject matter described herein can take the form of an entirely hardware embodiment, an entirely software embodiment or an embodiment containing both hardware and software elements. In a preferred embodiment, the pre-permissioning function is implemented in software, which includes but is not limited to firmware, resident software, microcode, and the like. The data (e.g., keys, secrets, tokens, etc.) can be configured into a data structure (e.g., an array, a linked list, etc.) and stored in a data store, such as computer memory. Furthermore, as noted above, the pre-permissioning functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the registration, pre-permission and access control functions are implemented in a special purpose computer, preferably in software executed by one or more processors. The associated data used by these functions is stored in an associated data store. The software also is maintained in one or more data stores or memories associated with the one or more processors, and the software may be implemented as one or more computer programs.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows.

The invention claimed is:

1. A method to manage access to protected resources hosted in a shared pool of configurable computing resources, comprising:

registering a third party application that is permitted to access protected resources on behalf of end users via a delegated authorization protocol;

for at least one end user associated with an organization, setting a permission that determines whether the third party application is permitted to access one or more protected resources associated with the end user, the permission associated with a policy; and responsive to a request by the third party application to access a protected resource, where the request is received via the delegated authorization protocol, using the permission to determine whether the third party application is permitted to access the protected resource by having a computing entity including a hardware element evaluate validity of one of: a credential associated with the request, and a token associated with the request, the credential uniquely identifying the third party application in the shared pool of configurable computing resources, the token uniquely identifying the end user in the shared pool of configurable computing resources; and applying the policy and returning a response to the request.

2. The method as described in claim 1 wherein the delegated authorization protocol is OAuth.

3. The method as described in claim 1 wherein the permission is set by an organization entity.

4. The method as described in claim 3 wherein the organization entity is an organization administrator.

5. The method as described in claim 1 further including evaluating a timestamp associated with the token.

6. The method as described in claim 1 wherein the permission is set for one of: the end user, and a set of end users that include the end user.

7. Apparatus to manage access to resources hosted in a shared pool of configurable computing resources, comprising:

a processor;

computer memory holding computer program instructions that when executed by the processor perform a method comprising:

registering a third party application that is permitted to access protected resources on behalf of end users via a delegated authorization protocol;

for at least one end user associated with an organization, setting a permission that determines whether the third party application is permitted to access one or more protected resources associated with the end user, the permission associated with a policy; and responsive to a request by the third party application to access a protected resource, where the request is received via the delegated authorization protocol, using the permission to determine whether the third party application is permitted to access the protected resource by evaluating validity of one of: a credential associated with the request, and a token associated with the request, the credential uniquely identifying the third party application in the shared pool of configurable computing resources, the token uniquely identifying the end user in the shared pool of configurable computing resources; and applying the policy and returning a response to the request.

8. The apparatus as described in claim 7 wherein the delegated authorization protocol is OAuth.

9. The apparatus as described in claim 7 wherein the permission is set by an organization entity.

10. The apparatus as described in claim 9 wherein the organization entity is an organization administrator.

11. The apparatus as described in claim 7 wherein the permission is set for one of: the end user, and a set of end users that include the end user.

12. A computer program product in a non-transitory computer readable medium for use in a data processing system to manage access to resources hosted in a shared pool of configurable computing resources, the computer program product holding computer program instructions which, when executed by the data processing system, perform a method comprising:

registering a third party application that is permitted to access protected resources on behalf of end users via a delegated authorization protocol;

for at least one end user associated with an organization, setting a permission that determines whether the third party application is permitted to access one or more protected resources associated with the end user, the permission associated with a policy; and responsive to a request by the third party application to access a protected resource, where the request is received via the delegated authorization protocol, using the permission to determine whether the third party application is permitted to access the protected resource by evaluating validity of one of: a credential associated with the request, and a token associated with the request, the credential uniquely identifying the third party application in the shared pool of configurable computing resources, the token uniquely identifying the end user in the shared pool of configurable computing resources; and applying the policy and returning a response to the request.

13. The computer program product as described in claim 12 wherein the delegated authorization protocol is OAuth.

14. The computer program product as described in claim 12 wherein the permission is set by an organization entity.

15. The computer program product as described in claim 14 wherein the organization entity is an organization administrator.

16. The computer program product as described in claim 12 wherein the permission is set for one of: the end user, and a set of end users that include the end user.

* * * * *